No. 887,938. PATENTED MAY 19, 1908.
W. C. HARTMANN.
FLEXIBLE BEARING.
APPLICATION FILED MAR. 5, 1907.
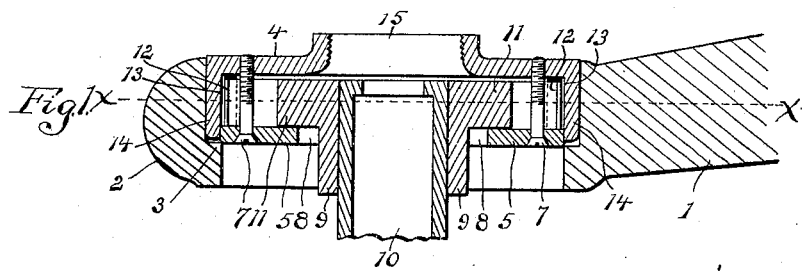
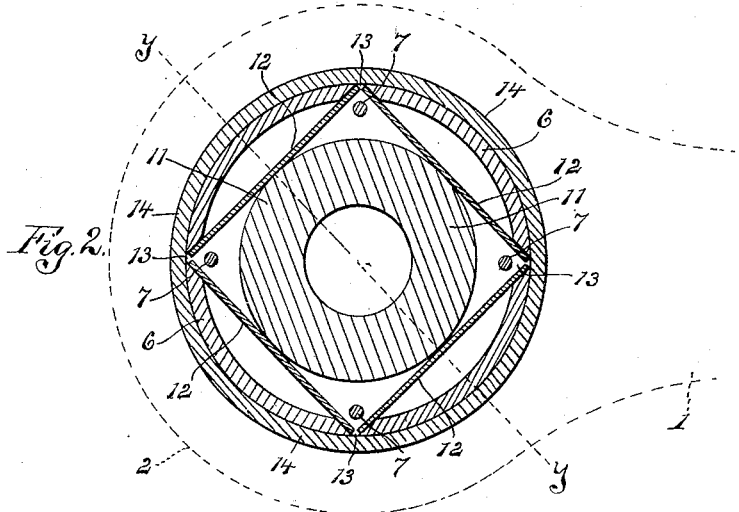
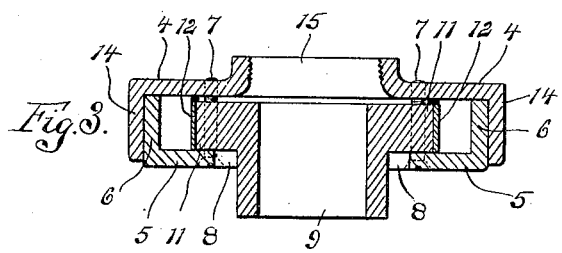
WITNESSES: INVENTOR:
William C. Hartmann

UNITED STATES PATENT OFFICE.

WILLIAM C. HARTMANN, OF LANSING, MICHIGAN, ASSIGNOR TO OMEGA SEPARATOR COMPANY, OF LANSING, MICHIGAN, A CORPORATION OF MICHIGAN.

FLEXIBLE BEARING.

No. 887,938.      Specification of Letters Patent.      Patented May 19, 1908.

Application filed March 5, 1907. Serial No. 360,677.

*To all whom it may concern:*

Be it known that I, WILLIAM C. HARTMANN, a citizen of the United States of America, residing at Lansing, in the county of Ingham and State of Michigan, have invented certain new and useful Improvements in Flexible Bearings, of which the following is a specification, reference being had therein to the accompanying drawings.

This invention relates to improvements in yielding bearings for shafts rotating at very high speeds and especially to bearings for the rapidly rotating parts of cream separators, the object of the invention being to provide a bearing which will absorb the vibrations caused by the very high speed at which the parts are turned, thus preventing consequent wear and friction, and also to provide a very simple cheap and efficient bearing which has no interlocking screw-threaded parts to work loose.

To this end the invention consists in the construction, arrangement and combination of parts substantially as hereinafter more fully described, reference being had to the accompanying drawing in which Figure 1 is a transverse vertical section of a device embodying the invention as applied for use in a cream separator; Fig. 2, a horizontal section on the line $x-x$ of Fig. 1 of the bearing detached; and Fig. 3 is a section of the same on the line $y-y$.

1 is a supporting bracket arm formed with a ring 2 having an inwardly projecting shoulder or ledge 3 near its lower edge upon which rests a suitable circular casing formed of an outer or cap member 4 of a size to fit within the opening of the ring and an inner or cup member 5 which fits closely within the cap member. These two members are firmly held together with the upper edge of the rim 6 of the cup in contact with the top of the cap, by four screws 7 passing through the bottom of the cup and engaging screw-threaded openings in the cap. In the axis of the cup is a circular opening 8 through which extends a bearing sleeve 9 of lesser diameter than said opening to receive the end of the tubular shaft 10 or other rotatable part which is turned at a very high rate of speed and said bearing sleeve is provided with an outwardly extending circular flange 11 within the cup, of greater diameter than the diameter of the opening 8 so that the sleeve cannot be removed from the casing without separating the cup and cap by removing the screws.

To yieldingly hold the bearing sleeve centered in the casing, four flat springs 12 are placed on edge within the cup with their middle portions engaging the edge of the bearing sleeve flange and their extreme ends engaging notches 13 in the rim 6 of the cup which notches sever the rim and form vertical slots therein. These springs are of lesser width than the height of the space within the casing so that they may bend freely and they are prevented from slipping endwise from the casing through the notches 13 by the downwardly extending outer flange or rim 14 of the cap.

In assembling the bearing, the springs are readily slipped into place and when in position with the cap secured in place, the parts are all securely held against possibility of displacement, and owing to the manner in which the springs are held it is not necessary that they be cut to an exact length, thus greatly facilitating the manufacture. The casing incloses and holds the parts of the bearing, thus forming a unit which is adapted to be placed in and held by any suitable support.

The cap of the casing may be formed with an axial flanged and screw-threaded opening 15 to receive the screw-threaded shank of a filler cup or other means (not shown) for conducting the fluid into the upper open end of the tube 10 when the bearing is used to support the upper end of the bowl of a centrifugal cream separator, as shown.

Having thus fully described my invention what I claim is:—

1. A yielding member comprising a circular casing having an axial opening and notches in its rim, a circular bearing member in the casing, and spring strips in the casing engaging the notches at their ends and the bearing member intermediate their ends.

2. In a yielding bearing, the combination of a circular casing consisting of two members one of which has a rim formed with slots and the other, a rim to fit over the slotted rim and close the slots, a circular bearing member, in the casing, and flat springs engaging the slots at their ends and the bearing member intermediate their ends.

3. In a yielding bearing, the combination of a circular casing having an axial opening and formed of two members one of which has a rim provided with inner notches which sever the rim and form transverse slots therein and the other member having a rim to fit over the slotted rims and close the slots, screws extending through the two members to secure the same together, a circular bearing member in the casing of a greater diameter than the diameter of the axial opening in said casing, and flat springs in the casing with the ends engaging the notches and engaging the bearing member intermediate their ends.

4. In a yielding bearing, the combination of a bearing sleeve to receive the rotatable member to be supported and formed with a circular flange, a cup member bearing an axial opening of lesser diameter than the diameter of the flange and of a greater diameter than the sleeve and formed with an outer rim provided with notches which sever the rim and orm vertical slots therein, a cap member having a rim to fit over the rim of the cup and close the slots, a series of flat springs contacting the flange of the bearing sleeve intermediate their ends and engaging the notches in the cup at their ends, and screws passing through the bottom of the cup and engaging screw-threaded openings in the cap to secure the cap and cup together.

In testimony whereof I affix my signature in presence of two witnesses.

WILLIAM C. HARTMANN.

Witnesses:
    A. WOODMANCY,
    DWIGHT SPEARS.